United States Patent Office.

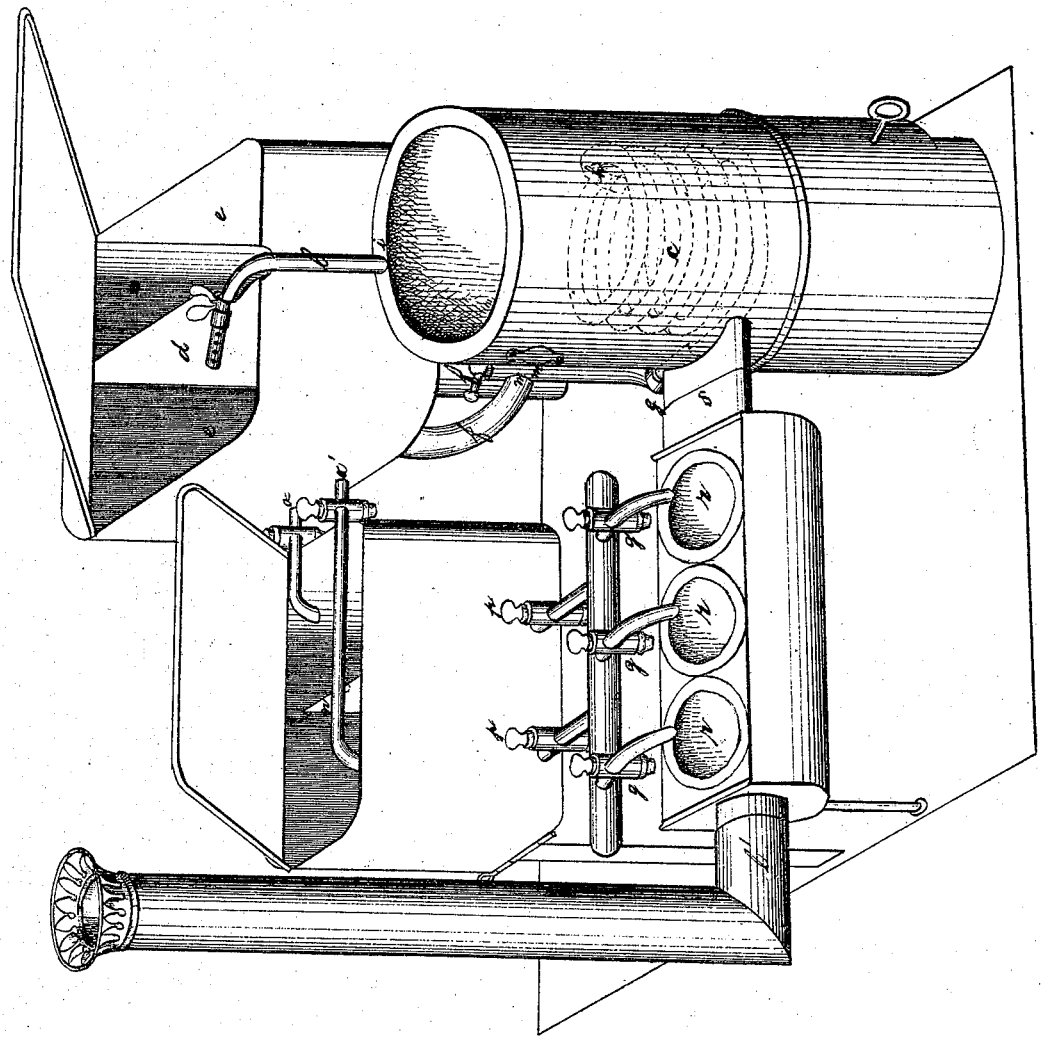

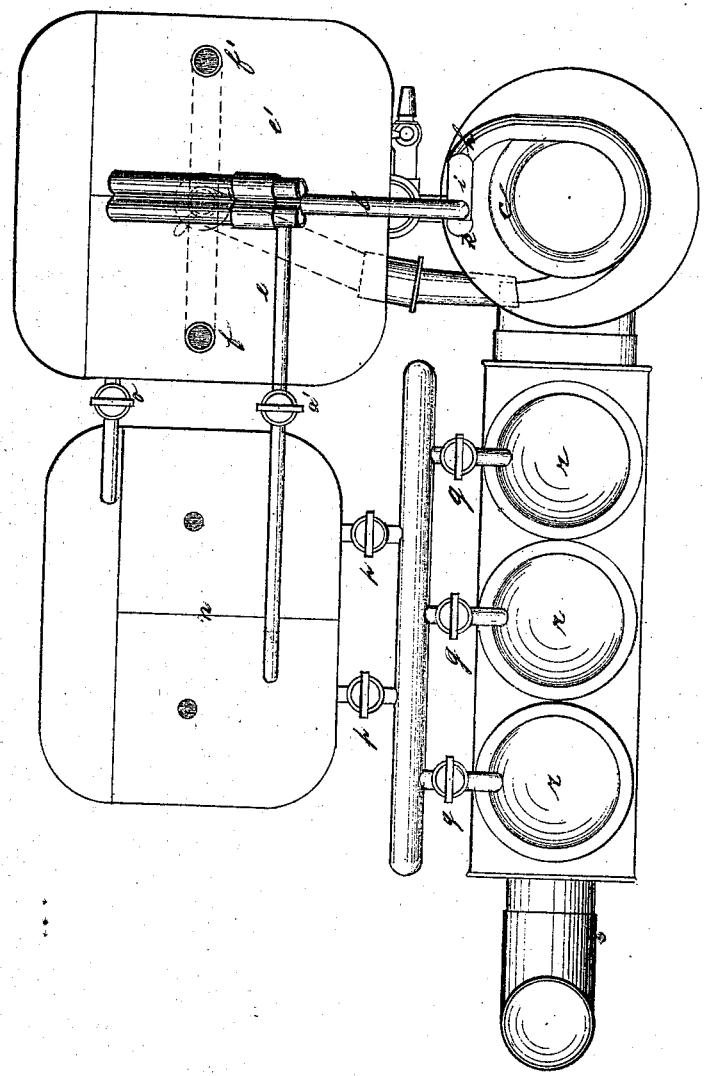

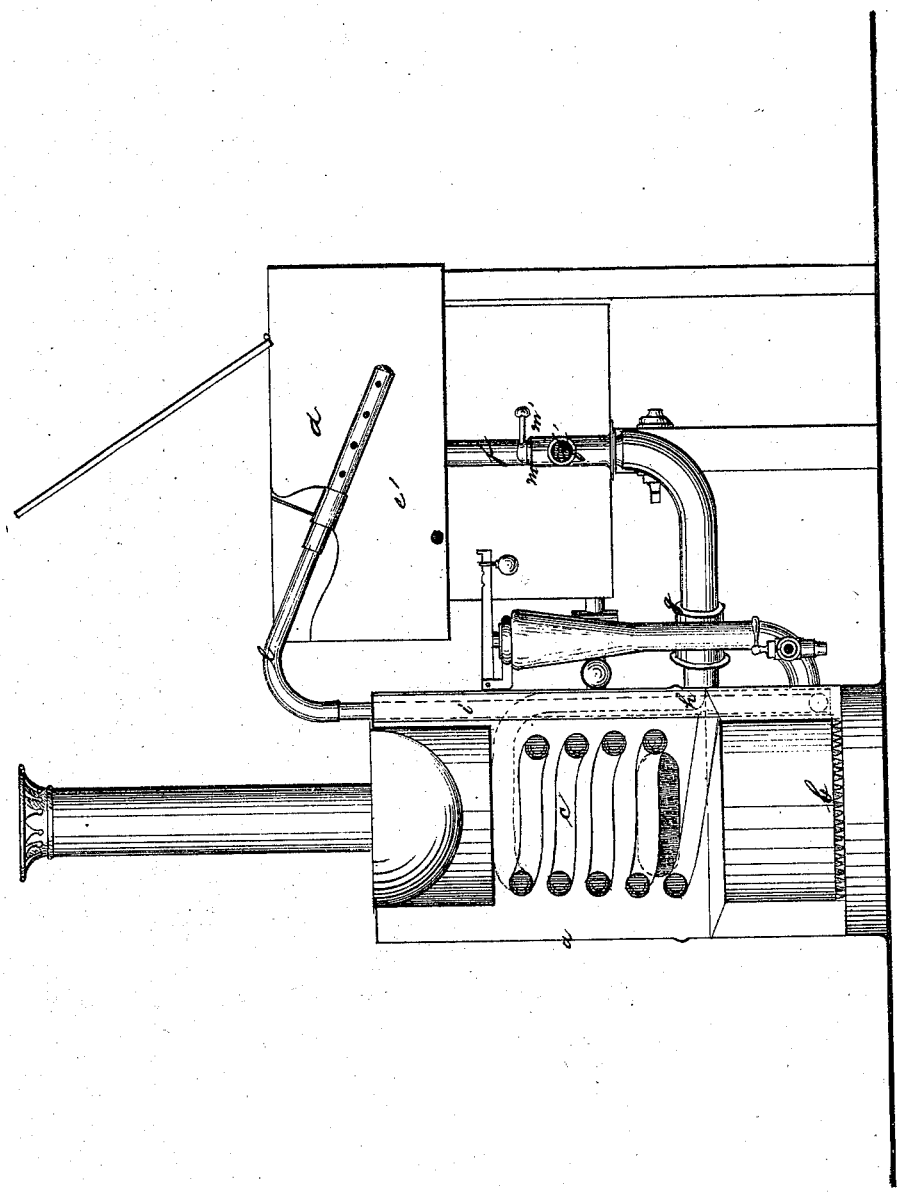

JACOB HEIM, OF NEW YORK, N. Y.

Letters Patent No. 100,528, dated March 8, 1870.

IMPROVEMENT IN EVAPORATING SALT-BRINES AND OTHER LIQUIDS.

The Schedule referred to in these Letters Patent and making part of the same.

To all whom it may concern:

Be it known that I, JACOB HEIM, of the city, county, and State of New York, have invented a new and improved Mode of Manufacturing Salt by Condensing Salt-Water or other Salty Liquids; and I hereby declare that the following is a full and exact description of the salt-manufacturing apparatus.

The nature of my invention consists of an evaporating apparatus to rectify salt-water to a high degree, and to bring it to salt.

I will proceed to describe the construction and the operation, as follows:

I construct a round iron stove, $a$, with fire-grate $b$, and bring in the same a winding-pipe, $c$, which with highest standing reservoir $d$, with two divisions, $e\ e'$, and connection-pipe $f\ f'$, with a check-valve $g$, connected.

The end of this winding-pipe connects by $h$ in a long, flat, upright holder, $i$, on whose bottom $k$ a discharging-pipe, $l$, discharges into the above said reservoir $d$, which I then fill with salt-water; and when I open one cock, $m\ m'$, then the salt-water will run through the connection-pipe $f\ f'$, through the winding-pipe $c$, over the fire-place $b$, and if through direct fire, it warms, then it extends and evaporates, and flows through pipe connection back into the high reservoir $d$, and the circulation of the salt-water, if carried on, will evaporate to a high degree. Now, this evaporated salt-water is led through the cocks $o\ o'$ into the lower reservoir $n$, for clearing, and when cleared the flowing salt is led through the bottom cocks $p\ p'$ of reservoir $n$ into the connection-pipe and cocks $g\ g\ g$, into the pans $r\ r\ r$, when the circulation of the fire through the flue $s$ and stove-pipe $t$, the remaining salt-water of high degree will evaporate and crystallize to salt.

What I claim as my invention, and desire to secure by Letters Patent, is as follows:

1. The general arrangement of the above-described apparatus.

2. The mode of manufacturing any salt or salty substance by the above-described apparatus.

3. The mode of rectifying any liquid by the above-described apparatus.

JACOB HEIM.

Witnesses:
   CHAS. KINKEL,
   WM. KLUNT.